United States Patent
Cabodi et al.

(10) Patent No.: US 8,288,300 B2
(45) Date of Patent: Oct. 16, 2012

(54) REFRACTORY WITH A HIGH ZIRCONIA CONTENT AND A HIGH SILICA CONTENT

(75) Inventors: Isabelle Cabodi, Cabaillon (FR); Michel Gaubil, Les Angles (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 99 days.

(21) Appl. No.: 12/673,138

(22) PCT Filed: Aug. 21, 2008

(86) PCT No.: PCT/FR2008/051516
§ 371 (c)(1),
(2), (4) Date: May 28, 2010

(87) PCT Pub. No.: WO2009/027611
PCT Pub. Date: Mar. 5, 2009

(65) Prior Publication Data
US 2010/0257901 A1 Oct. 14, 2010

(30) Foreign Application Priority Data
Aug. 24, 2007 (FR) ...................................... 07 57171

(51) Int. Cl.
*C04B 35/484* (2006.01)
(52) U.S. Cl. ........................................ 501/105; 501/107
(58) Field of Classification Search .................. 501/105, 501/107
See application file for complete search history.

(56) References Cited

U.S. PATENT DOCUMENTS

| | | |
|---|---|---|
| 3,343,593 A | 9/1967 | Goton et al. |
| 4,461,843 A | 7/1984 | McGarry et al. |
| 4,507,394 A | 3/1985 | Mase et al. |
| 5,023,218 A | 6/1991 | Zanoli et al. |
| 5,028,572 A | 7/1991 | Kim et al. |
| 5,086,020 A | 2/1992 | Ishino et al. |
| 5,344,801 A | 9/1994 | Kida et al. |
| 5,466,643 A | 11/1995 | Ishino et al. |
| 5,679,612 A | 10/1997 | Endo et al. |
| 7,129,192 B2 * | 10/2006 | Boussant-Roux et al. .... 501/105 |
| 7,598,195 B2 | 10/2009 | Gupta et al. |
| 7,655,587 B2 * | 2/2010 | Boussant-Roux et al. .... 501/105 |
| 7,687,422 B2 * | 3/2010 | Boussant-Roux et al. .... 501/105 |
| 7,842,633 B2 | 11/2010 | Tomura et al. |
| 2005/0159294 A1 | 7/2005 | Boussant-Roux et al. |
| 2008/0076659 A1 | 3/2008 | Boussant-Roux et al. |
| 2009/0038936 A1 | 2/2009 | Boussant-Roux et al. |
| 2009/0176642 A1 | 7/2009 | Tomura et al. |
| 2010/0068492 A1 * | 3/2010 | Boussant-Roux et al. .... 428/220 |
| 2010/0089098 A1 * | 4/2010 | Citti et al. .................. 65/374.13 |
| 2010/0257901 A1 | 10/2010 | Cabodi et al. |

FOREIGN PATENT DOCUMENTS

| | | |
|---|---|---|
| EP | 0 403 387 A1 | 12/1990 |
| FR | 1 208 577 | 2/1960 |
| FR | 1 208 577 A | 2/1960 |
| FR | 75 893 | 7/1961 |
| FR | 82 310 | 12/1963 |
| FR | 1 430 962 A | 1/1966 |
| FR | 2 701 022 A1 | 8/1994 |
| FR | 2897861 * | 8/2007 |
| FR | 2897862 * | 8/2007 |
| GB | 930605 | 7/1963 |
| GB | 1 036 893 | 7/1966 |
| JP | A-2000-302560 | 10/2000 |
| JP | A-2003-292382 | 10/2003 |
| JP | A-2004-099441 | 4/2004 |
| WO | WO 03/074445 A1 | 9/2003 |
| WO | WO 2005/068393 A1 | 7/2005 |

OTHER PUBLICATIONS

International Search Report issued in International Patent Application No. PCT/FR2008/051516 on Mar. 11, 2009 (with Translation).
Written Opinion of the International Search Authority issued in International Application No. PCT/FR2008/051516 on Mar. 11, 2009 (with Translation).
Written Opinion of the International Searching Authority mailed on Mar. 10, 2009 in corresponding International Application No. PCT/FR2008/051515 (with translation).
Mar. 10, 2009 International Search Report issued in International Application No. PCT/FR2008/051515 (with translation).
Oct. 28, 2011 Notice of Allowance issued in U.S. Appl. No. 12/526,675.
Apr. 13, 2011 Office Action issued in U.S. Appl. No. 12/526,675.
Aug. 18, 2011 Office Action issued in U.S. Appl. No. 12/526,675.
Nov. 8, 2011 Office Action issued in U.S. Appl. No. 12/672,795.
U.S. Appl. No. 12/672,795 in the name of Cabodi et al., filed Mar. 26, 2010.
U.S. Appl. No. 12/526,675 in the name of Boussant-Roux et al., filed Oct. 30, 2009.
Mar. 8, 2012 Final Rejection issued in U.S. Appl. No. 12/672,795.

* cited by examiner

*Primary Examiner* — Karl Group
(74) *Attorney, Agent, or Firm* — Oliff & Berridge, PLC

(57) ABSTRACT

The invention provides a novel fused cast refractory product with a high zirconia content having improved electrical resistivity. Said refractory product comprises, as a percentage by weight based on the oxides and for a total of more than 98.5%:

| | |
|---|---|
| $ZrO_2 + Hf_2O$: | >85%; |
| $SiO_2$: | >10% to 12%; |
| $Al_2O_3$: | 0.1% to 2.4%; |
| $B_2O_3$: | <1.5%; and | a dopant selected from the group formed by $V_2O_5$, $CrO_3$, $Nb_2O_5$, $MoO_3$, $Ta_2O_5$, $WO_3$, and mixtures thereof, in a weighted quantity as expressed below:

$2.43V_2O_5+4.42CrO_3+1.66Nb_2O_5+3.07MoO_3+Ta_2O_5+1.91WO_3 \geq 0.2\%$.

25 Claims, No Drawings

REFRACTORY WITH A HIGH ZIRCONIA CONTENT AND A HIGH SILICA CONTENT

This application is a National Phase application of international application PCT/FR2008/051516, filed on Aug. 21, 2008, which claims priority to FR 0757171, filed on Aug. 24, 2007.

The invention relates to a fused cast refractory product with a high zirconia content.

BACKGROUND

Refractory products include fused cast products, which are well known in the construction of glass-melting furnaces, and sintered products.

In contrast to sintered products such as those described, for example, in United States patent U.S. Pat. No. 4,507,394, fused cast products usually include an intergranular vitreous phase connecting together the crystalline grains. The problems posed by sintered products and by fused cast products, and the technical solutions adopted to overcome them thus generally differ. A composition that has been developed for the production of a sintered product is thus not, a priori, of use per se in producing a fused cast product, and vice versa.

Fused cast products, often termed electrofused products, are obtained by melting a mixture of appropriate starting materials in an electric arc furnace or by using any other technique that is suitable for such products. The molten liquid is then cast into a mold and the product obtained undergoes a controlled cooling cycle to bring it to ambient temperature without fracturing. This operation is termed "annealing" in the art.

Fused cast products include electrofused products with a high zirconia content, i.e. comprising more than 85% by weight of zirconia ($ZrO_2$); they are well known for their very good resistance to corrosion without coloring the glass produced and without generating defects.

Conventionally, fused cast products with a high zirconia content also include sodium oxide ($Na_2O$) to prevent the formation of zircon from the zirconia and silica present in the product. Zircon formation is in fact deleterious, since it is accompanied by a reduction in volume of the order of 20%, thus creating mechanical stresses that are the source of cracks.

The product ER-1195 produced and marketed by the Société Européenne des Produits Réfractaires and protected by European patent EP-B-0 403 387, is currently widely used in glass-melting furnaces. Its chemical composition comprises approximately 94% of zirconia, 4% to 5% of silica, approximately 1% of alumina, 0.3% of sodium oxide and less than 0.05% by weight of $P_2O_5$. It is typical of products with a high zirconia content that are used in glass furnaces.

French patent FR-A-2 701 022 describes fused cast products with a high zirconia content that contain 0.05% to 1.0% by weight of $P_2O_5$ and 0.05% to 1.0% by weight of boron oxide, $B_2O_3$. Said products have a high electrical resistivity. This can advantageously stabilize the consumption of electricity during electric melting of the glass and above all, this can overcome any problems with short circuiting in refractories, causing their rapid degradation. During electric melting of glass, some of the electric current passes through the refractory products. Thus, increasing the resistivity of said refractory products can reduce the quantity of electric current that passes through them.

International patent document WO-A-2005/068393 describes fused cast products with a high zirconia content with a high electrical resistivity while minimizing the quantities of BaO, SrO, MgO, CaO, $P_2O_5$, $Na_2O$, and $K_2O$. Said products contain 0.1% to 1.2% by weight of $B_2O_3$.

Japanese patent document JP 2000 302 560 describes fused cast products that do not contain $Nb_2O_5$ or $Ta_2O_5$.

The current trend for very high quality glass, in particular glass for LCD type flat screens, is increasing the demand for refractory products from glass-melting furnaces. In particular, there is a need for refractory products with further improved electrical resistivity while retaining good resistance to corrosion by the molten glass.

SUMMARY

The aim of the present invention is to satisfy this need.

More particularly, it provides a fused cast refractory product with a high zirconia content comprising, as a percentage by weight based on the oxides and for a total of more than 98.5%, preferably more than 99% and more preferably more than 99.5%:

| | |
|---|---|
| $ZrO_2 + Hf_2O$: | >85%; |
| $SiO_2$: | >10% to 12%; |
| $Al_2O_3$: | 0.1% to 2.4%; |
| $B_2O_3$: | <1.5%; and | a dopant selected from the group formed by $V_2O_5$, $CrO_3$, $Nb_2O_5$, $MoO_3$, $Ta_2O_5$, $WO_3$, and mixtures thereof, in a weighted quantity as expressed in formula (1) below:

$$2.43V_2O_5 + 4.42CrO_3 + 1.66Nb_2O_5 + 3.07MoO_3 + Ta_2O_5 + 1.91WO_3 \geq 0.2\%.$$

As can be seen below, surprisingly, the refractory product of the invention has a remarkable electrical resistivity while retaining good resistance to corrosion by molten glass.

Detailed Description of Embodiments

Preferably, the refractory product of the invention also has one or, as is preferable, more of the following optional characteristics:

- the weighted quantity of dopant is 0.5% or more, preferably 0.6% or more, more preferably 1.2% or more, and/or 3% or less, preferably 2.5% or less, more preferably 1.4% or less;
- the total quantity of dopant is 0.05% or more, preferably 0.1% or more and/or 0.5% or less, preferably 0.4% or less, as a molar percentage based on the oxides;
- the dopant is selected from $V_2O_5$, $Nb_2O_5$, $Ta_2O_5$, $WO_3$, and mixtures thereof, preferably from $Nb_2O_5$, $Ta_2O_5$ and mixtures thereof;
- in one embodiment, the dopant is $Nb_2O_5$.
- Preferably, the quantity by weight of $Nb_2O_5$ is more than 0.1%;
  - in a further embodiment, the dopant is a mixture of $Nb_2O_5$ and $Ta_2O_5$, the quantity of $Nb_2O_5$ being more than 0.1% and the quantity of $Ta_2O_5$ being more than 0.1%, as a percentage by weight based on the oxides;
- the quantity of $B_2O_3$ is more than 0.05%, preferably more than 0.1%, more preferably more than 0.25%;
- the quantity by weight of boron oxide $B_2O_3$ is 1.0% or less, preferably 0.8% or less;
- the quantity of yttrium oxide $Y_2O_3$ is 1% or less, preferably 0.5% or less, more preferably 0.2% or less;

the quantity of alumina $Al_2O_3$ is 0.4% or more, preferably 0.5% or more, more preferably 0.6% or more and/or 1.5% or less, preferably 1% or less, more preferably 0.85% or less;

the quantity by weight of barium oxide, HaO, is 0.6% or less, preferably less than 0.5%;

the species other than $ZrO_2+HfO_2$, $SiO_2$, $B_2O_3$, $Al_2O_3$, $Y_2O_3$, BaO, and dopant (constituting the complement to 100%) represent, by weight, less than 1.5%, preferably less than 1%, and more preferably less than 0.5%;

the species other than $ZrO_2+HfO_2$, $SiO_2$, $B_2O_3$, $Al_2O_3$, $Y_2O_3$, and dopant (constituting the complement to 100%) represent, by weight, less than 1.5%, preferably less than 1%, and more preferably less than 0.5%;

the complement by weight to 100% is constituted by impurities;

the quantity of impurities (essentially oxides of iron, titanium, phosphorus, sodium, and calcium) is less than 0.6%, preferably less than 0.3%;

the quantity by weight of sodium oxide $Na_2O$ is 0.1% or less, preferably 0.05% or less, more preferably 0.03% or less.

Advantageously, these characteristics can further improve the electrical resistivity and the corrosion resistance of the product of the invention.

The refractory product of the invention preferably has an electrical resistivity of 400 Ω·cm [ohm·centimeter] or more, more preferably 500 Ω·cm or more, still more preferably 600 Ω·cm or more at 1500° C. at a frequency of 100 Hz [hertz].

The invention also provides a glass-melting furnace including a refractory product in accordance with the invention or a refractory product that is produced or that may be produced using a method in accordance with the invention, in particular in regions intended to come into contact with molten glass. In the furnace of the invention, the refractory product may advantageously form part of a tank for the preparation of glass by melting, especially by electrical melting, where it is susceptible of coming into contact with molten glass at a temperature of more than 1200° C.

The refractory product of the invention is not intended to be brought into contact with molten glass at temperatures of less than 1100° C.

Finally, the invention provides a method of producing a refractory product in accordance with the invention, comprising the following steps in succession:

a) mixing starting materials, with the introduction of a dopant, to form a starting charge;

b) melting said starting charge until a molten liquid is obtained;

c) casting and solidifying said molten liquid by controlled cooling to obtain a refractory product;

said method being remarkable in that said starting materials are selected such that said refractory product is in accordance with the invention.

The "weighted" content or quantity of dopant designates here the quantity:

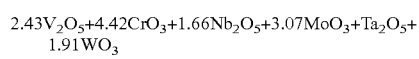

$$2.43V_2O_5+4.42CrO_3+1.66Nb_2O_5+3.07MoO_3+Ta_2O_5+1.91WO_3$$

in which the quantities of oxides are expressed as a percentage by weight.

Unless otherwise mentioned, all of the percentages in the present description are percentages by weight based on the oxides.

In the fused cast products of the invention, the high zirconia content, i.e. $ZrO_2>7$ 85%, means that it can satisfy the demands for high corrosion-resistance without coloring the glass produced and without generating defects that are deleterious to the quality of said glass.

Hafnium oxide, $HfO_2$, present in the product of the invention is the hafnium oxide naturally present in sources of zirconia. Its quantity by weight in the product of the invention is thus 5% or less, generally 2% or less.

The presence of silica is necessary for the formation of an intergranular vitreous phase that can effectively accommodate variations in the volume of the zirconia during its reversible allotropic transformation, i.e. during passage from the monoclinic phase to the tetragonal phase. The silica content may be more than 10.1%, or even more than 10.5%.

The presence of alumina is necessary for the formation of a stable vitreous phase and for good castability of products into the mold. An excessive amount causes instability of the vitreous phase (crystal formation).

Yttrium oxide, $Y_2O_3$, has an unfavorable effect on electrical resistivity, but its presence can be accepted in a quantity of less than 1%, preferably less than 0.5%, more preferably less than 0.2%.

The presence of dopant in the products of the invention is necessary in order to improve the electrical resistivity. However, the total weighted content of said oxides must preferably not exceed 4% so that the percentage of zirconia is kept at a sufficiently high level to ensure excellent resistance to corrosion by the molten glass and to retain good stability in the vitreous phase.

The inventors have established that all the pentavalent dopants have a substantially identical effect at identical molar quantities. This is also true for all the hexavalent dopants. Furthermore, the inventors have observed that the molar efficiency of the hexavalent dopants $M^{6+}$ is almost twice as great as that of the pentavalent dopants $M^{5+}$. Without wishing to be bound by any particular theory, the inventors explain this difference by the role of dopants as regards oxygen voids in the zirconia. Hexavalent dopants $M^{6+}$ would in fact compensate for two oxygen voids, as opposed to just one for pentavalent dopants $M^{5+}$. One mole of an oxide of a pentavalent dopant $M_2O_5$ would thus have an identical effect to one mole of an oxide of a hexavalent dopant $MoO_3$.

Regarding the weighted quantity of dopant, the differences between the molar masses of the dopants should also be taken into account. Thus, 1.66 g [gram] of $Ta_2O_5$ has an equivalent effect to 1 g of $Nb_2O_5$.

The complement to 100% in the composition of the product of the invention is constituted by other species. The term "other species" means species that are not particularly desired, but that are generally present in the starting materials as impurities.

Examples that may be mentioned are alkaline oxides, in particular sodium oxide $Na_2O$ and potassium oxide $K_2O$, which can be accepted but preferably must not exceed 0.5%, more preferably 0.1%, and more preferably be present in trace amounts only Otherwise, electrical resistivity would be degraded because of the increased conductivity of the vitreous phase. Oxides of iron, titanium, and phosphorus are known to be harmful, and their contents must be limited to traces introduced with the starting materials as impurities. Preferably, the quantity of $Fe_2O_3+TiO_2$ is less than 0.55%, and that of $P_2O_5$ is less than 0.05%.

A product of the invention may be produced by following steps a) to c) described below:

a) mixing starting materials, with the introduction of a dopant, to form a starting charge;

b) melting said starting charge until a molten liquid is obtained;

c) solidifying said molten liquid by controlled cooling to obtain a refractory product in accordance with the invention.

In step a), the dopant is added in a manner that guarantees the quantity of dopant in the finished product of the invention.

In step b), melting is preferably carried out by the combined action of a fairly long electric arc that does not cause reduction and stirring, favoring re-oxidation of the products. Melting is carried out at a temperature of more than 2300° C., preferably in the range 2400° C. to 2500° C.

To minimize the formation of nodules with a metallic appearance and to prevent the formation of apertures or crazing in the finished product, it is preferable to carry out melting under oxidizing conditions.

Preferably, a long arc fusion method is used as described in French patent FR-A-1 208 577 and its patents of addition, numbers 75893 and 82310.

That method consists in using an electric arc furnace the arc of which arcs between the charge and at least one electrode that is separated from said charge, and adjusting the length of the arc so that its reducing action is reduced to a minimum, while maintaining an oxidizing atmosphere above the melt and stirring said melt either by the action of the arc itself or by bubbling an oxidizing gas (air or oxygen, for example) into the melt or by adding to the melt substances which release oxygen, such as peroxides.

In step c), cooling is preferably carried out at a rate of less than 20° C. per hour, preferably at a rate of about 10° C. per hour.

Any conventional method of producing fused products based on zirconia intended for applications in glass-melting furnaces may be employed, provided that the composition of the starting charge allows products to be produced with a composition that is in accordance with that of the product of the invention.

As an example, the use of a continuous induction melting and solidification furnace, as described in FR-A-1 430 962, is possible and allows products to be produced that have a particularly homogeneous zirconia content.

The product of the invention is constituted by grains of zirconia more than 80%, more than 90%, more than 99% or substantially 100% of which are unstabilized monoclinic zirconia, surrounded by a vitreous phase that is more than 50%, more than 70%, or even more than 90% or substantially 100% constituted by silica, as a percentage by weight.

The products of the invention may advantageously be used in any other application which requires a refractory product with a high electrical resistivity.

Clearly, the present invention is not limited to the implementations described and represented by way of illustrative, non-limiting example.

EXAMPLES

The following non-limiting examples are given with the aim of illustrating the invention.

In these examples, the following starting materials were used:

zirconia principally containing, as a mean percentage by weight, 98.5% of $ZrO_2$+$HfO_2$, 0.2% of $SiO_2$ and 0.02% of $Na_2O$;

zircon sand containing 33% silica;

type AC44 alumina sold by Pechiney and containing a mean of 99.4% of alumina $Al_2O_3$;

oxides of barium, boron, yttrium, tantalum, $Ta_2O_5$, and niobium, $Nb_2O_5$, with a purity of more than 99%.

The examples were prepared using the conventional arc furnace melting method then cast to obtain blocks with a 220×450×150 mm [millimeter] format.

The chemical analysis of the products obtained is given in Table 1; it is a mean chemical analysis given as a percentage by weight with the exception of the column indicating the molar percentage of the sum of the oxides $Ta_2O_5$ and $Nb_2O_5$.

In this table, a blank entry corresponds to a quantity of 0.05% by weight or less.

The $Na_2O$ content is not indicated; it was always less than 0.05% by weight.

In the various examples of blocks that were produced, cylindrical bars of the product that were 30 mm in diameter and 30 mm in height were subjected to a potential difference of 1 volt at a frequency of 100 Hz at 1500° C. to carry out the measurements of electrical resistivity R.

TABLE 1

|   | $ZrO_2$ | $SiO_2$ | $B_2O_3$ | $Al_2O_3$ | $Nb_2O_5$ | $Y_2O_3$ | BaO | $Ta_2O_5$ + $Nb_2O_5$ (mol %) | R ($\Omega \cdot$ cm) |
|---|---|---|---|---|---|---|---|---|---|
| 1 | 87.6 | 10.2 | 0.53 | 0.53 | 0.80 | 0.19 | 0.10 | 0.33 | 813 |
| 2 | 87.4 | 10.8 | 0.89 | 0.54 | 0.20 | 0.18 | 0.03 | 0.08 | 1348 |
| 3 | 87.3 | 11.2 | 0.60 | 0.54 | 0.16 | 0.17 | 0.02 | 0.07 | 1165 |

The invention claimed is:

1. A fused cast refractory product with a high zirconia content comprising, as a percentage by weight based on the oxides and for a total of more than 98.5%:

| $ZrO_2$ + $Hf_2O$: | >85%; |
| $SiO_2$: | >10% to 12%; |
| $Al_2O_3$: | 0.1% to 2.4%; |
| $B_2O_3$: | <1.5%; and | a dopant selected from the group consisting of $V_2O_5$, $CrO_3$, $Nb_2O_5$, $MoO_3$, $Ta_2O_5$, $WO_3$, and mixtures thereof, in a weighted quantity as expressed below:

$2.43V_2O_5 + 4.42CrO_3 + 1.66Nb_2O_5 + 3.07MoO_3 + Ta_2O_5 + 1.91WO_3 \geq 0.2\%$.

2. A refractory product according to claim 1, in which the dopant is selected from the group consisting of $Nb_2O_5$, $Ta_2O_5$, $WO_3$, and mixtures thereof.

3. A refractory product according to claim 1, in which the dopant is selected from the group consisting of $Nb_2O_5$, $Ta_2O_5$ and mixtures thereof.

4. A refractory product according to claim 1, in which a quantity of $B_2O_3$ is more than 0.1%.

5. A refractory product according to claim 1, further including $Y_2O_3$, a quantity of $Y_2O_3$ being 1% or less.

6. A refractory product according to claim 1, in which a quantity of dopant is 0.05% or more and 0.4% or less, as a percentage by weight based on the oxides.

7. A refractory product according to claim 1, in which the $SiO_2$ content is more than 10.5%, as a percentage by weight based on the oxides.

8. A refractory product according to claim 1, in which the $Y_2O_3$ content is less than 0.5%, as a percentage by weight based on the oxides.

9. A refractory product according to claim 1, in which the $Al_2O_3$ content is 1% or less, as a percentage by weight based on the oxides.

10. A refractory product according to claim 1, in which the $Al_7O_3$ content is 0.85% or less, as a percentage by weight based on the oxides.

11. A refractory product according to claim 1, in which the $Al_2O_3$ content is 0.4% or more, as a percentage by weight based on the oxides.

12. A refractory product according to claim 1, further including $Na_2O$, the $Na_2O$ content being less than 0.1%.

13. A refractory product according to claim 1, in which the $Na_2O$ content is 0.03% or less.

14. A method of producing a refractory product comprising the following steps in succession:
   a) mixing starting materials to form a starting charge;
   b) melting said starting charge until a molten liquid is obtained;
   c) casting and solidifying said molten liquid by controlled cooling, to obtain a refractory product;

wherein said starting materials are selected such that said refractory product is in accordance with claim 1.

15. A method according to claim 14, in which melting is carried out under oxidizing conditions.

16. A method according to claim 14, in which melting is carried out using an induction furnace or using a long arc.

17. A method according to claim 14 in which, in step c), cooling is carried out at a rate of less than 20° C. per hour.

18. A glass-melting furnace, including a refractory product according to claim 1.

19. A furnace according to claim 18, said refractory product forming part of a tank for preparing glass by electrical melting, where it is susceptible of coming into contact with molten glass at a temperature of more than 1200° C.

20. A refractory product according to claim 1, in which a weighted quantity of dopant is 0.5% or more.

21. A refractory product according to claim 1, in which a weighted quantity of dopant is 3% or less.

22. A refractory product according to claim 1, in which a weighted quantity of dopant is 0.6% or more.

23. A refractory product according to claim 1, in which a weighted quantity of dopant is 1.4% or less.

24. A refractory product according to claim 1, in which a quantity of $B_2O_3$ is more than 0.05%.

25. A refractory product according to claim 1, in which a quantity of $B_2O_3$ is less than 1%.

* * * * *